US006418263B1

(12) United States Patent
Mardirossian et al.

(10) Patent No.: US 6,418,263 B1
(45) Date of Patent: Jul. 9, 2002

(54) METHOD AND APPARATUS FOR STORING A FIBER OPTIC ASSEMBLY

(75) Inventors: Hovhannes Habib Mardirossian, Morris Plains; Wali Shah, Newark; Victor J. Talamini, Sr., Ashbury, all of NJ (US)

(73) Assignee: Tyco Submarine Systems Ltd., Morristown, NJ (US)

( * ) Notice: Subject to any disclaimer, the term of this patent is extended or adjusted under 35 U.S.C. 154(b) by 0 days.

(21) Appl. No.: 09/238,609

(22) Filed: Jan. 28, 1999

(51) Int. Cl.[7] .................................................. G02B 6/00
(52) U.S. Cl. ....................................................... 385/135
(58) Field of Search ............................. 385/135, 88–94

(56) References Cited

U.S. PATENT DOCUMENTS 4,846,343 A * 7/1989 Rupert ........................ 206/303
4,861,134 A * 8/1989 Alameel et al. ............. 385/135
5,668,909 A * 9/1997 Mozzati ...................... 385/134
5,703,990 A * 12/1997 Robertson et al. .......... 385/135
5,915,061 A * 6/1999 Vanoli ........................ 385/135

* cited by examiner

Primary Examiner—Rodney Bovernick
Assistant Examiner—Michael J. Stahl (57) ABSTRACT

An apparatus and method for storing a fiber optic assembly are disclosed. In one embodiment, a fiber optic assembly storage apparatus that includes a storage tray is disclosed. The storage tray has a first side and a second side where the first side defines a plurality of storage channels. The first side defines an optical component storage channel, a plurality of optical component storage cells, an optical component fiber storage channel, and a coupling fiber storage channel. The optical component fiber storage channel is disposed at a first end of the optical component storage channel and the coupling fiber storage channel interconnects the optical component storage channel and the plurality of optical component storage cells. A tray cover may also be provided that is positioned on the first side of the storage tray.

15 Claims, 9 Drawing Sheets

METHOD AND APPARATUS FOR STORING A FIBER OPTIC ASSEMBLY

BACKGROUND OF THE INVENTION

The present invention relates to an apparatus and method for storing a fiber optic assembly. More specifically, the invention provides a storage tray for storing a fiber optic assembly that includes an optical isolator, a laser, and a spliced length of fiber that optically couples the isolator and laser.

Fiber optic communication systems are carrying more and more of the world's information. Fiber optic assemblies are utilized to transmit and receive the optical signals that are carried in the optical fibers that connect the assemblies. One of these assemblies, mentioned above, includes an optical isolator, a laser, and a fiber that optically couples the isolator and laser. The assembly is installed within a terminal equipment optical shelf which houses circuit packs.

Currently there is no known method or apparatus designed for storing the optical assembly where separate storage receptacles are provided for each optical component, i.e., the isolator, laser, and coupling fiber, in a single structural storage apparatus. Currently, the optical assembly is merely stored in a container without individually supporting each component, e.g., placing the assembly into a box-type container. This storage methodology presents problems. Because each optical component is not individually supported and contained within the storage container, the components can be damaged as a result of movement of the components within the container. Additionally; because the length of fiber that couples the isolator to the laser is not positioned within its own dedicated storage receptacle, the fiber could be damaged as a result of, among other reasons, twisting, tangling, or bending of the fiber.

Therefore, it would be desirable to provide an improved apparatus and method for storing a fiber optic assembly.

SUMMARY OF THE INVENTION

In accordance with the present invention, an apparatus and method for storing a fiber optic assembly are provided. In one embodiment, a fiber optic assembly storage apparatus that includes a storage tray is disclosed. The storage tray has a first side and a second side where the first side defines a plurality of storage channels. The first side defines an optical component storage channel, a plurality of optical component storage cells, an optical component fiber storage channel, and a coupling fiber storage channel. The optical component fiber storage channel is disposed at a first end of the optical component storage channel and the coupling fiber storage channel interconnects the optical component storage channel and the plurality of optical component storage cells. A tray cover may also be included that is disposed on the first side of the storage tray.

BRIEF DESCRIPTION OF THE DRAWINGS

The various features of the invention will best be appreciated by simultaneous reference to the description which follows and the accompanying drawings, in which.

DETAILED DESCRIPTION

Figure 1:
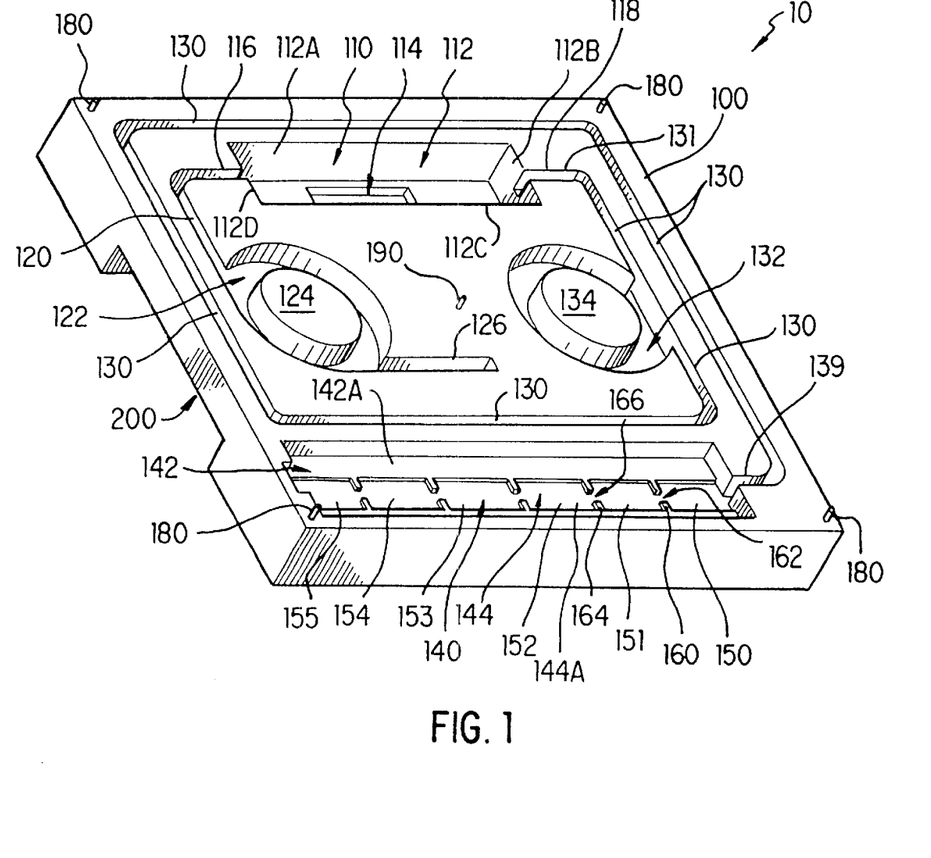
FIG. 1 is a top perspective view of a fiber optic assembly storage apparatus in accordance with the present invention.

FIG. 1 illustrates an embodiment for a fiber optic assembly storage apparatus in accordance with the principles of the present invention. As can be seen in FIG. 1, fiber optic assembly storage apparatus 10 may be formed as a tray which includes a first, top side 100 and a second, underside 200. First, top side 100 defines a plurality of channels in which may be stored optical components and a fiber that optically connects the optical components, as will be further described later in this specification. By positioning the optical components within fiber optic assembly storage apparatus 10, the fiber optic components may be securely stored prior to their installation in a larger optical unit, which may be, by example, an optical pump unit in an optical shelf. Thus, fiber optic assembly storage apparatus 10 assists an operator in storing optical components and also assists the user in the final assembly of the optical components into the larger optical unit because the optical components are positioned in fiber optical assembly storage apparatus 10 such that their positioning within the storage apparatus correlates to their ultimate positioning within the larger optical unit into which they are to be ultimately installed.

In further describing fiber optic assembly storage apparatus 10, it can be seen in FIG. 1 that top side 100 defines optical component storage channel 110, a plurality of optical component storage cells 140, and a coupling fiber storage channel 130, which interconnects optical component storage channel 110 to the plurality of optical component storage cells 140. Optical component storage channel 110 may be formed to store a variety of optical components within the channel, however, the particular embodiment of FIG. 1 for optical component storage channel 10 is formed to store an optical isolator. Likewise, the plurality of optical component storage cells 140 may also store a variety of optical components, however, the embodiment of FIG. 1 is particularly formed to store a fiber optic laser. Coupling fiber storage channel 130 provides a channel that interconnects optical component storage channel 110 to the plurality of optical component storage cells 140 and extends around an outer circumference of topside 100 of fiber optic assembly storage apparatus 10. Coupling fiber storage channel 130 is formed to store an optical fiber within it that is connected at a first end to the isolator stored in optical component storage channel 110 and at a second end to the optical laser that is stored in one of the plurality of optical component storage cells 140.

As will be further explained later in this specification, in utilizing fiber optic assembly storage apparatus 10, a user would position an optical isolator within optical component storage channel 110 and store the optical fiber that connects the optical isolator to the fiber optic laser within coupling fiber storage channel 130. The majority of the length of fiber that interconnects the isolator to the fiber optic laser is wound within a coupling fiber spool channel 132 that intersects with coupling fiber channel 130. After the majority of the fiber is wound within coupling fiber spool channel 132, the remaining fiber length is wound around a circumference of fiber optic assembly storage apparatus 10 within coupling fiber channel 130. Coupling fiber channel 130 ends at the plurality of optical component storage cells 140 and opens into it. Depending upon the remaining length of fiber that is not stored within coupling fiber channel 130 and which therefore extends from second end 139 of coupling fiber channel 130 into the plurality of optical component storage cells 140, the user would select one of the plurality of optical component storage cells for positioning of the optical laser. The user would select a particular storage cell for storing the optical laser within it such that when the laser is positioned within one of the storage cells, the remaining length of fiber that is connected to the laser and which is not installed within coupling fiber channel 130 is axially aligned with the longitudinal axis of the plurality of optical component storage cells, i.e., in an uncoiled. or unkinked, straight line.

As can also be seen in FIG. 1, top side 100 of fiber optic assembly storage apparatus 10 also defines an optical component fiber storage channel 120 which is disposed at a first end 116 of optical component storage channel 110. Additionally, top side 100 defines a circularly-shaped optical component fiber spool channel 122 and an optical component connector channel 126. The purpose of optical component fiber storage channel 120, optical component fiber spool channel 122, and optical component connector channel 126 is to store an optical connector that is associated with an isolator that is stored in optical component storage channel 110 and the fiber that connects the connector to the isolator. The isolator includes a connector such that, as is well-known in the art, the fiber optic assembly that includes the isolator and the optical laser that is stored within fiber optic assembly storage apparatus 10 may be connected to a larger optical unit. The optical fiber that connects the isolator to the connector stored within optical component connector channel 126 is positioned within optical component fiber storage channel 120 and wound around hub 124 which serves to define circularly-shaped optical component fiber spool channel 122.

A more detailed description will now be provided for the previously described channels defined by top side 100 of fiber optic assembly storage apparatus 10. Optical component storage channel, or isolator channel, 110 is generally rectangular in configuration and is formed such that an optical isolator can be securely positioned within channel 110. Isolator channel 110 is formed by four walls, namely, walls 112A, 112B, 112C, and 112D. As can also be seen in FIG. 1, isolator channel 110 includes two depths within it. First depth 112 is defined by the four walls described previously and second depth 114 is generally centrally disposed within isolator channel 110. A purpose for including two depths within isolator channel 110 would be to position the isolator base within the second depth 114 and position any extended structure associated with the side of the isolator, such as mounting boots, within first depth 112. Additional representative dimensional information for isolator channel 110 will be provided when discussing FIG. 3.

Extending from second end 118 of isolator channel 110 is coupling fiber channel 130. A first end 131 of coupling fiber channel 130 is integrally formed with isolator channel 110. Associated with coupling fiber channel 130 is circularly-shaped coupling fiber spool channel 132. Coupling fiber spool channel 132 intersects with coupling fiber storage channel 130. As mentioned previously, the majority of the optical fiber that connects the optical isolator to the optical laser is wound within coupling fiber spool channel 132 around coupling fiber spool hub 134. The remaining fiber that is not wound within coupling fiber spool channel 132 is wound within the portion of coupling fiber channel 130 that extends around an outer circumference of fiber optic assembly storage apparatus 10. Coupling fiber channel 130 ends at a second end 139 that is integrally formed with the plurality of optical laser storage cells 140.

It is desirable to include fiber spool hubs 124 and 134, and thus fiber spool channels 122 and 132, because the lengths of optical fibers that are to be stored in storage apparatus 10 may not be known and the lengths of fiber may not be able to be accommodated in fiber storage channels 120, 130. The lengths of the fibers may depend upon the particular assembly that is to be stored and thus, the spool hubs and spool channels provide storage space for the varying lengths of fibers.

As described previously, an optical laser is positioned within one of the plurality of optical component storage cells, or laser storage channel, 140. Laser storage channel 140 includes storage cells 150, 151, 152, 153, 154, and 155. Laser storage channel 140 also includes a first depth 142 and a second depth 144. Surface 142A defines the base of first depth 142 and surface 144A defines the base of second depth 144. Each laser storage cell is defined by a front wall structure and a rear wall structure. For example, as can be seen in FIG. 1, laser storage cell 151 is defined by front wall structure 160 and rear wall structure 164. An aperture is included in each of the front wall structures and the rear wall structures, such as aperture 162 in front wall structure 160 and aperture 166 in rear wall structure 164, which define laser storage cell 151.

In describing how an optical laser would be positioned within one of the storage cells, a representative laser would include a box-shaped body structure that would include a top and a bottom, two sides, and a front wall and a rear wall. The laser would be positioned within one of the storage cells such that the front wall of the laser would be positioned adjacent to the front wall structure of the storage cell and the rear wall of the laser would be positioned adjacent to the rear wall structure of the storage cell. The bottom of the optical laser would be positioned on surface 144A which defines the second depth of the laser storage cell and the top of the optical laser would extend up into the first depth 142 of the storage cell. Extending from each side of the optical laser would be electrical pin connections which would extend over surface 142A which defines the base of first depth 142 of the laser storage cell. Also associated with the optical laser would be a connector that would extend from the front wall of the optical laser and which would be oriented perpendicular to the electrical pin connections that extend from the side walls. The front wall connector of the optical laser would be joined to the optical fiber that connects the optical laser to the optical isolator. The optical laser connector would be positioned within the aperture that is defined by the front wall structure of the laser storage cell into which the optical laser has been positioned. Thus, clearance is provided within the front wall structure of the laser storage cell such that the connector of the optical laser may be accommodated within the storage cell.

As can be understood, based on the description above, the plurality of optical component storage cells are aligned on a common axis and are positioned in an adjacent relationship with each other. The front wall structure of a rearward storage cell serves as the rear wall structure of a forward storage cell. Additional representative dimensional information for the laser storage cells will be provided when discussing FIGS. 4 and 5.

As can also be seen in FIG. 1, in this embodiment, extending from top side 100 of fiber optic assembly storage apparatus 10 are a plurality of mounting pins. Mounting pins 180 are located at the corners of square, or rectangularly-shaped, fiber optic assembly storage apparatus 10. Mounting pin 190 extends from top side 100 and is generally located at the geometric center of top side 100. As will be described further later in this specification, mounting pins 180 and 190 are received within apertures that are included in a tray cover that may be positioned onto top side 100 of fiber optic assembly storage apparatus 10.

Figure 2:
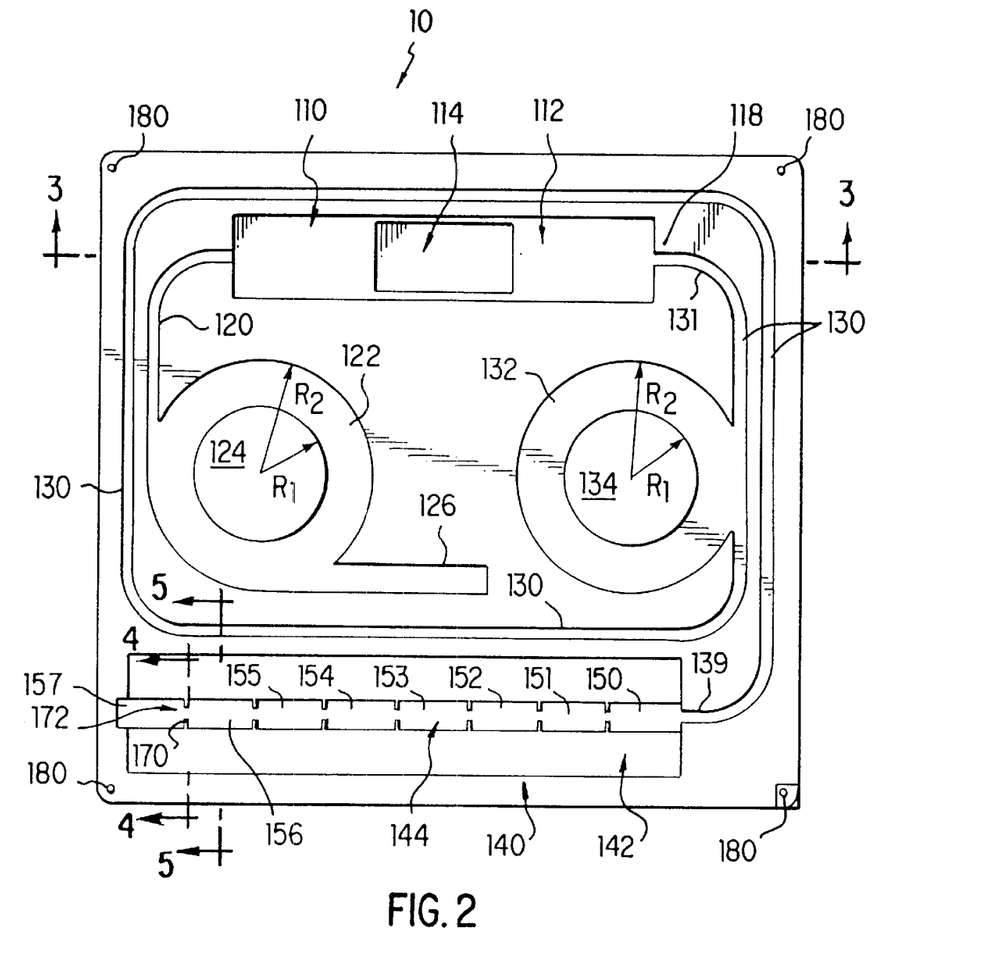
FIG. 2 is a top view of a second embodiment for a fiber optic assembly storage apparatus.

FIG. 2 is a top view of an embodiment for fiber optic assembly storage apparatus 10 in accordance with the present invention. The embodiment of FIG. 2 is similar to the embodiment of FIG. 1, however, the embodiment of FIG. 2 includes additional laser storage cells, namely cells 156 and 157. Like reference numerals are utilized in FIG. 2 where describing features also included in FIG. 1. As is evident when considering FIG. 2, the present invention is not limited to any particular number of laser storage cells and may include any number of storage cells depending upon the particular requirements of the assembly which is to be stored within storage apparatus 10.

As can be seen in FIG. 2, circularly-shaped optical component fiber spool channel 122 and coupling fiber spool channel 132 are defined by an inner radius $R_1$ of 1.2 inches and an outer radius $R_2$ of 2.0 inches. It is desirable that a minimum inner radius $R_1$ of 1.2 inches is utilized in order to prevent the optical fibers that are spooled within the channels from being damaged due to stresses that could be imparted to the fibers if a lesser radius was utilized. Additionally, the radii described in FIG. 2 correlate with the radii that could be encountered when the optical assembly is removed from storage apparatus 10 and installed within a larger optical unit, such as the optical shelf which was mentioned previously.

As was mentioned above, the embodiment of FIG. 2 for storage apparatus 10 includes additional laser storage cells 156 and 157. Wall structure 170, which is the front wall structure for storage cell 157 and the rear wall structure for storage cell 156, includes aperture 172 within it, as described previously. Additional reference to storage cells 156 and 157 will be made when discussing FIGS. 4 and 5.

Figures 3, 4:
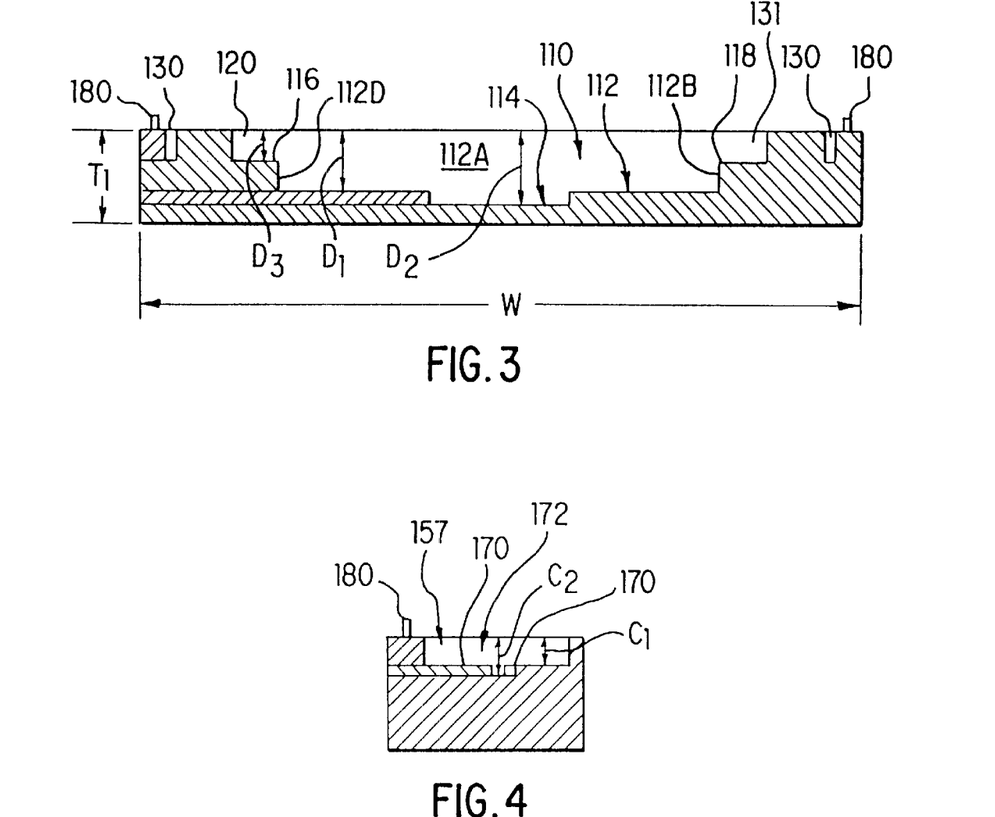
FIG. 3 is a across-sectional view of the fiber optic assembly storage apparatus of FIG. 2 as taken along line 3—3 of FIG. 2.
FIG. 4 is a cross-sectional view of the fiber optic assembly storage apparatus of FIG. 2 as taken along line 4—4 of FIG. 2.

FIG. 3 is a cross-sectional view of isolator channel 10 as taken along line 3—3 in FIG. 2. As can be seen in FIG. 3, a representative thickness, or depth, for storage apparatus 10 is a depth $T_1$ of 1.5 inches. As was described previously, optical isolator channel 110 includes a first depth $D_1$ of 1.0 inches and a second depth $D_2$ of 1.2 inches. Fiber channel 120, as well as fiber spool channel 122, connector channel 126, coupling fiber channel 130, and coupling fiber spool channel 132, all have a depth $D_3$ of approximately 0.5 inches. The overall width W of storage apparatus 10 is approximately 12.25 inches.

Figure 5:
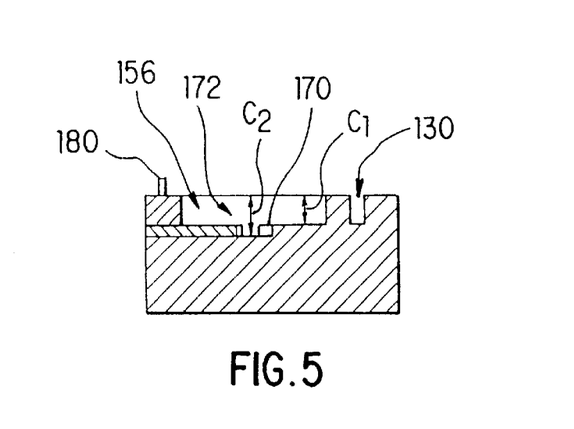
FIG. 5 is a cross-sectional view of the fiber optic assembly storage apparatus of FIG. 2 as taken along line 5—5 of FIG. 2.

As can be seen in FIGS. 4 and 5, and as was mentioned previously, each laser storage cell includes a first depth and a second depth. First depth $C_1$ is approximately 0.4 inches and second depth $C_2$ is approximately 0.5 inches.

Figure 6:
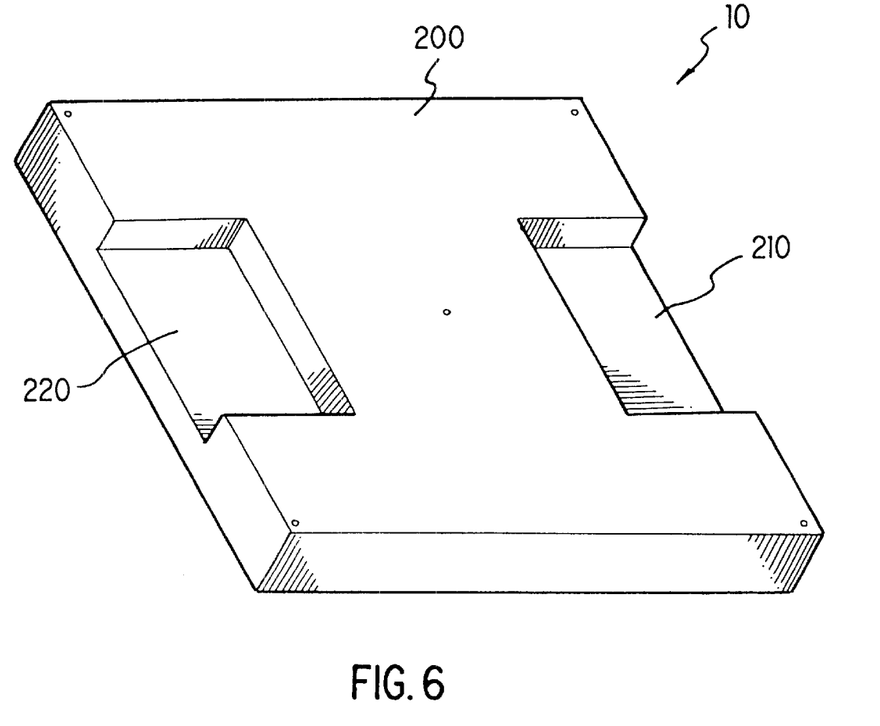
FIG. 6 is a bottom perspective view of the fiber optic assembly storage apparatus of FIG. 1.
Figure 7:
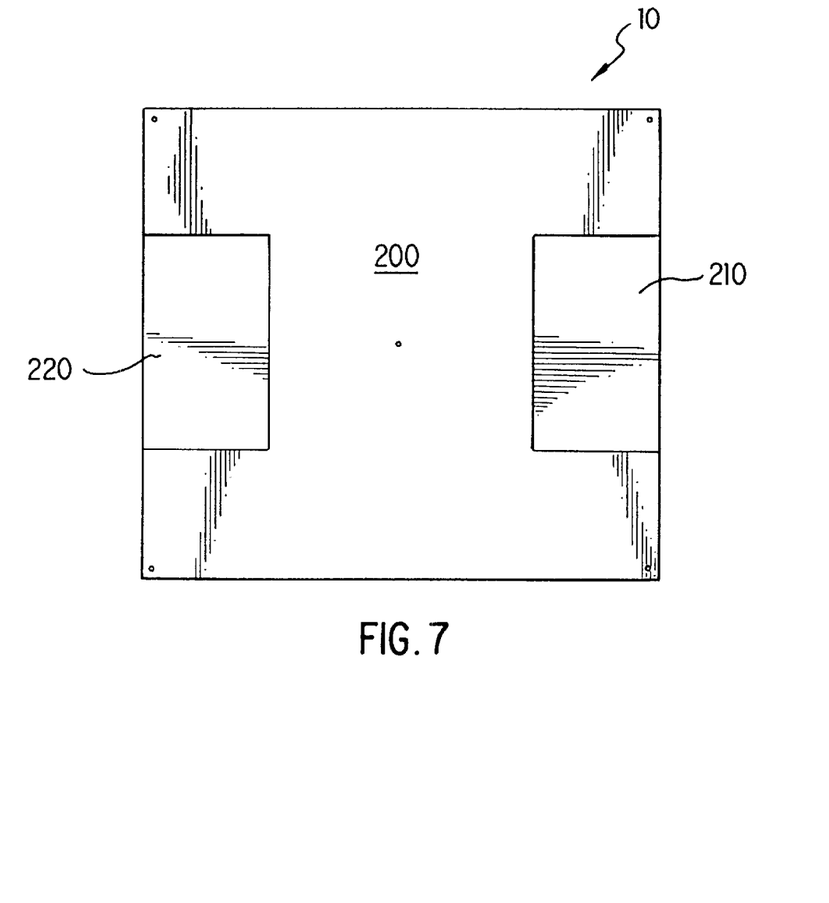
FIG. 7 is a bottom view of the fiber optic assembly storage apparatus of FIG. 6.
Figure 8:
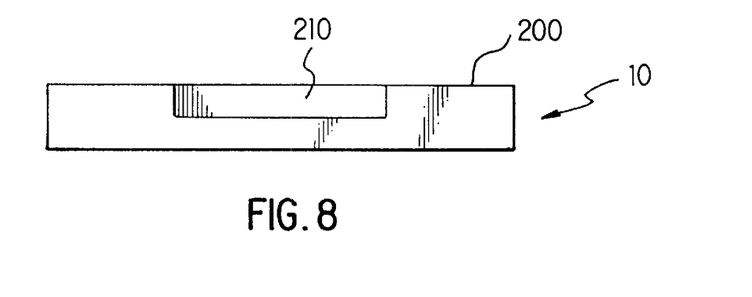
FIG. 8 is a side view of the fiber optic assembly storage apparatus of FIG. 6.

As was mentioned previously, storage apparatus 10 includes a second, or underside, 200 as can be seen in FIGS. 6–8. Underside 200 defines a first access port 210 and a second access port 220. Access ports 210, 220 are disposed on opposite sides of second side 200 of storage apparatus 10 and each access port is defined in a rectangular configuration. As will be described further later in this specification, multiple storage apparatuses 10 may be stacked on top of each other. By providing access ports on the underside of each storage apparatus, the user is able to grasp the storage apparatus from underneath by inserting his/her hands within the access ports in order to lift a particular storage apparatus off of the storage apparatus upon which it is positioned. It is understood that access ports 210, 220 provide utility for a user even if multiple storage apparatuses are not stacked upon each other. The present invention is not limited to any particular size, shape, or positioning for access ports 210, 220 and any of a variety of different configurations can be utilized for the access ports.

Figure 9:
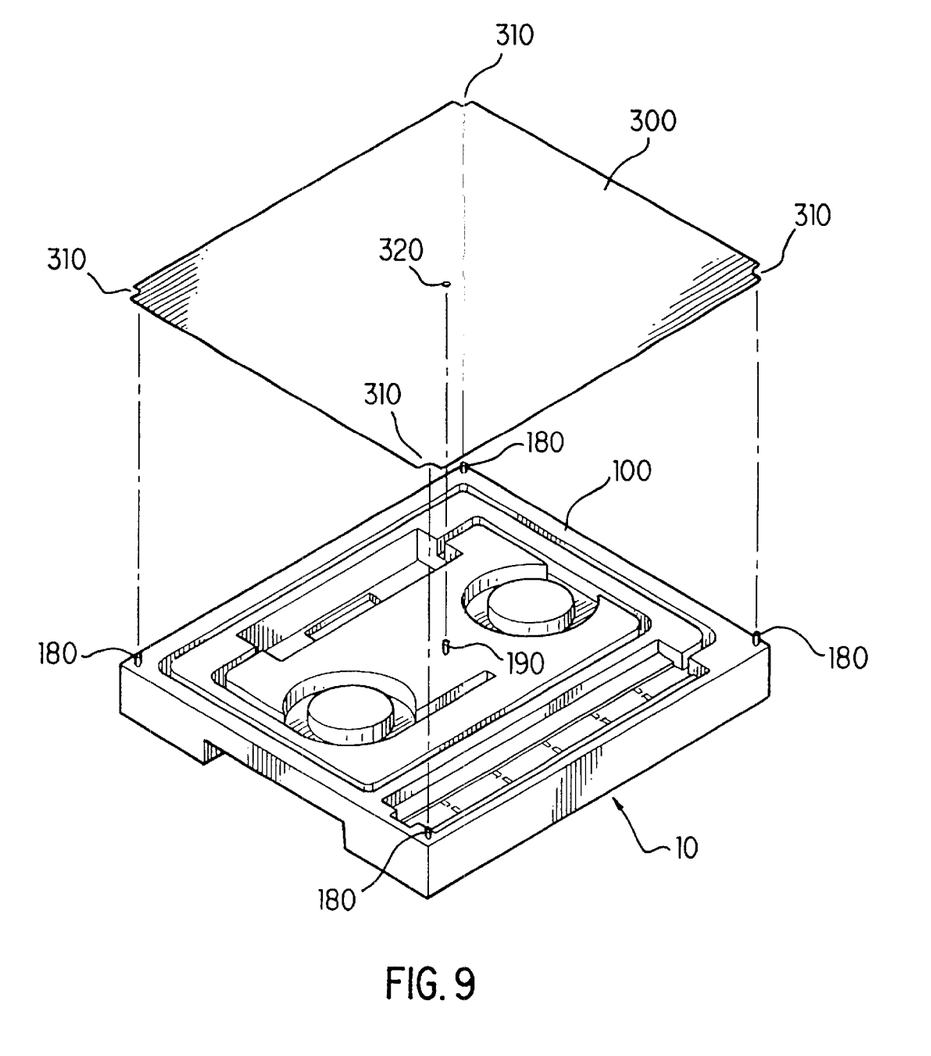
FIG. 9 is a top exploded perspective view of the fiber optic assembly storage apparatus of FIG. 1 and an embodiment for a tray cover.
Figure 10:
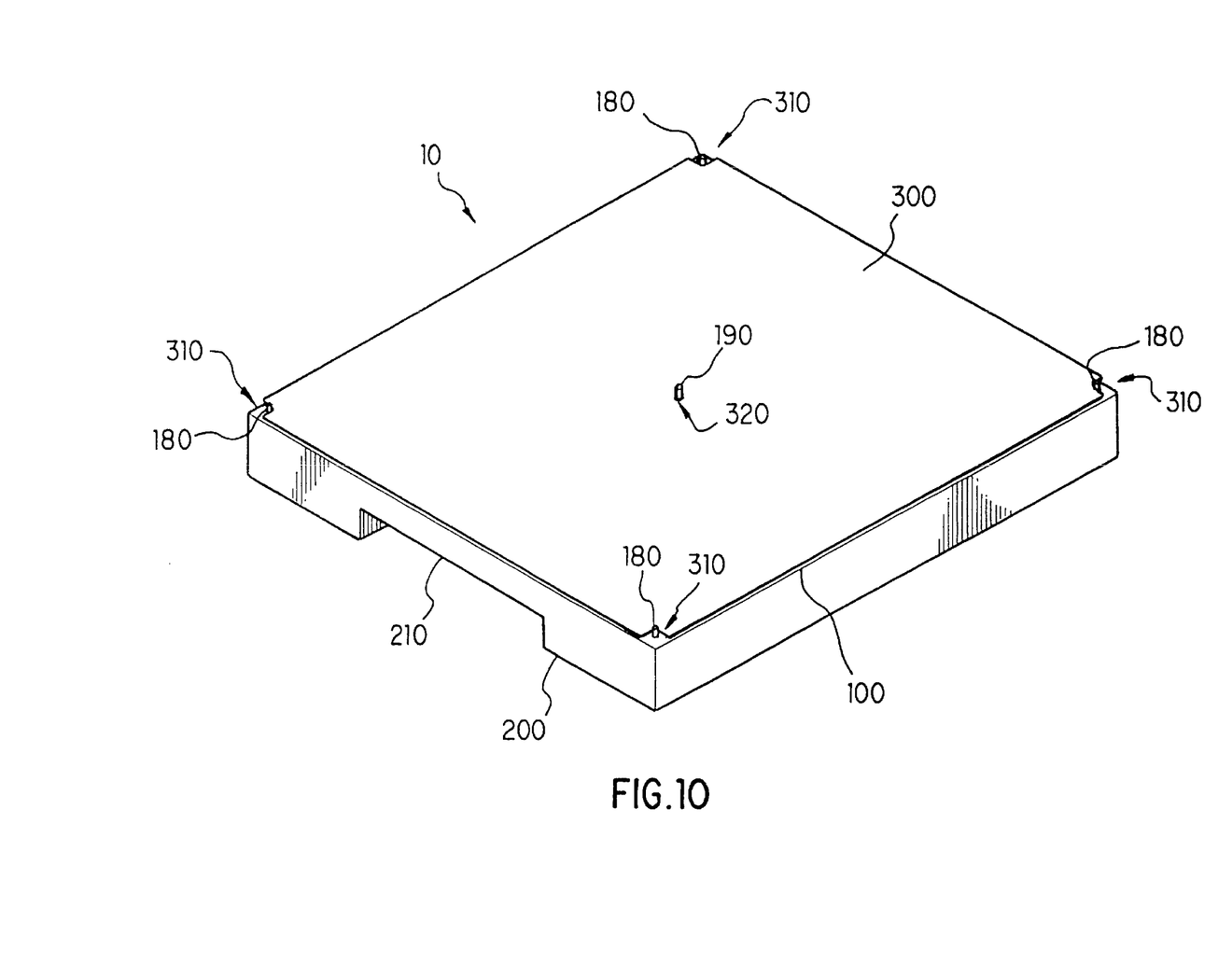
FIG. 10 is a top perspective view of the fiber optic assembly storage apparatus and tray cover of FIG. 9 in an assembled configuration.

As was mentioned previously, the present invention may include a tray cover 300, an embodiment of which is illustrated in FIGS. 9 and 10. Tray cover 300 is generally a thin, planar member that has dimensions which are similar to the outer dimensions for storage apparatus 10. As can be seen, tray cover 300 defines a plurality of apertures which, when tray cover 300 is placed onto top side 100 of storage apparatus 10, receive within them the mounting pins that are disposed on first side 100 of storage apparatus 10. As such, tray cover 300 defines corner notches 310 that are included on each of the four corners of tray cover 300. Each corner notch 310 is formed by a right angle and mounting pin 180 is positioned within corner notch 310. Thus, as can be understood, when each of the mounting pins 180 is positioned within corner notches 310, tray cover 300 will not be able to rotate on top side 100 of storage apparatus 10 and thus will be maintained in position on storage apparatus 10. Tray cover 300 also defines a mounting aperture 320 which is generally located in the geometric center of tray cover 300 and into which is received mounting pin 190 that is included on top side 100 of storage apparatus 10. Thus, tray cover 300 can be placed onto top side 100 of storage apparatus 10 and its relative positioning with respect to storage apparatus 10 can be maintained through the interaction of the mounting pins on top side 100 and the apertures defined by tray cover 300.

FIG. 10 illustrates an assembled configuration where tray cover 300 has been placed onto top side 100 of storage apparatus 10. As can be understood, while not illustrated in FIG. 10, multiple storage apparatuses 10 can be stacked on top of each other. In order to assist in the positioning of one storage apparatus onto another storage apparatus, mounting pins 180 and 190 can be of a sufficient length such that they extend up above the plane of tray cover 300 where they could possibly mate with aligned apertures included on underside 200 of a particular storage apparatus such that the relative positioning of one storage apparatus with a second, stacked storage apparatus can be maintained.

The use of fiber optic assembly storage apparatus 10 will now be further described. As mentioned previously, an optical isolator is positioned within isolator channel 110 which is defined by top side 100 of fiber optic assembly storage apparatus 10. A connector that is associated with the isolator is positioned within isolator connector channel 126. The fiber that interconnects the connector that is positioned within connector channel 126 and the isolator that is positioned within isolator channel 110 is positioned within fiber channel 120 and spooled around fiber spool hub 124. The optical fiber that interconnects the isolator to the fiber optic laser is positioned within coupling fiber channel 130. The majority of the optical fiber is wound around coupling fiber spool hub 134 in coupling fiber spool channel 132. A portion of the remaining fiber is positioned within the portion of coupling fiber channel 130 that extends around a circumference of fiber optic assembly storage apparatus 10. Depending upon the length of optical fiber that extends from second end 139 of coupling fiber channel 130 and into laser storage channel 140, the user would select one of a plurality of laser storage cells for positioning the fiber optic laser within that particular storage cell. The user would select a particular storage cell for storing the fiber optic laser such that the remaining fiber length that is attached to the fiber optic laser can be positioned within laser storage channel 140 without requiring spooling of the fiber within channel 140, i.e., the fiber can be positioned in a straight line within channel 140. The fiber stored within laser storage channel 140 can be positioned within the apertures that are defined by the front and rear wall structures of each storage cell.

Thus, the present invention provides an apparatus for storing a fiber optic assembly that includes a first optical component, such as an optical isolator, and a second optical component, such as a fiber optic laser, that are coupled by an optical fiber. The second optical component is stored within one of a plurality of storage cells based upon the length of optical fiber that is not stored within coupling fiber channel 130. As such, the fiber optic assembly is stored in a container that individually supports each component. This storage methodology presents significant advances over the previously known practice of merely placing the assembly into a box-type container without individually supporting each component. The previously known practice can result in the components being damaged as a result of movement of the components within the container.

The present invention also provides for a tray cover 300 that may be positioned onto the top side 100 of storage apparatus 10. Tray cover 300 is positioned onto storage apparatus 10 by aligning apertures that are defined by tray cover 300 with mounting tabs that are included on storage apparatus 10. Multiple storage apparatuses 10 may be stacked upon each other in order to provide for storing multiple assemblies in a unitary structural configuration.

Figure 11:
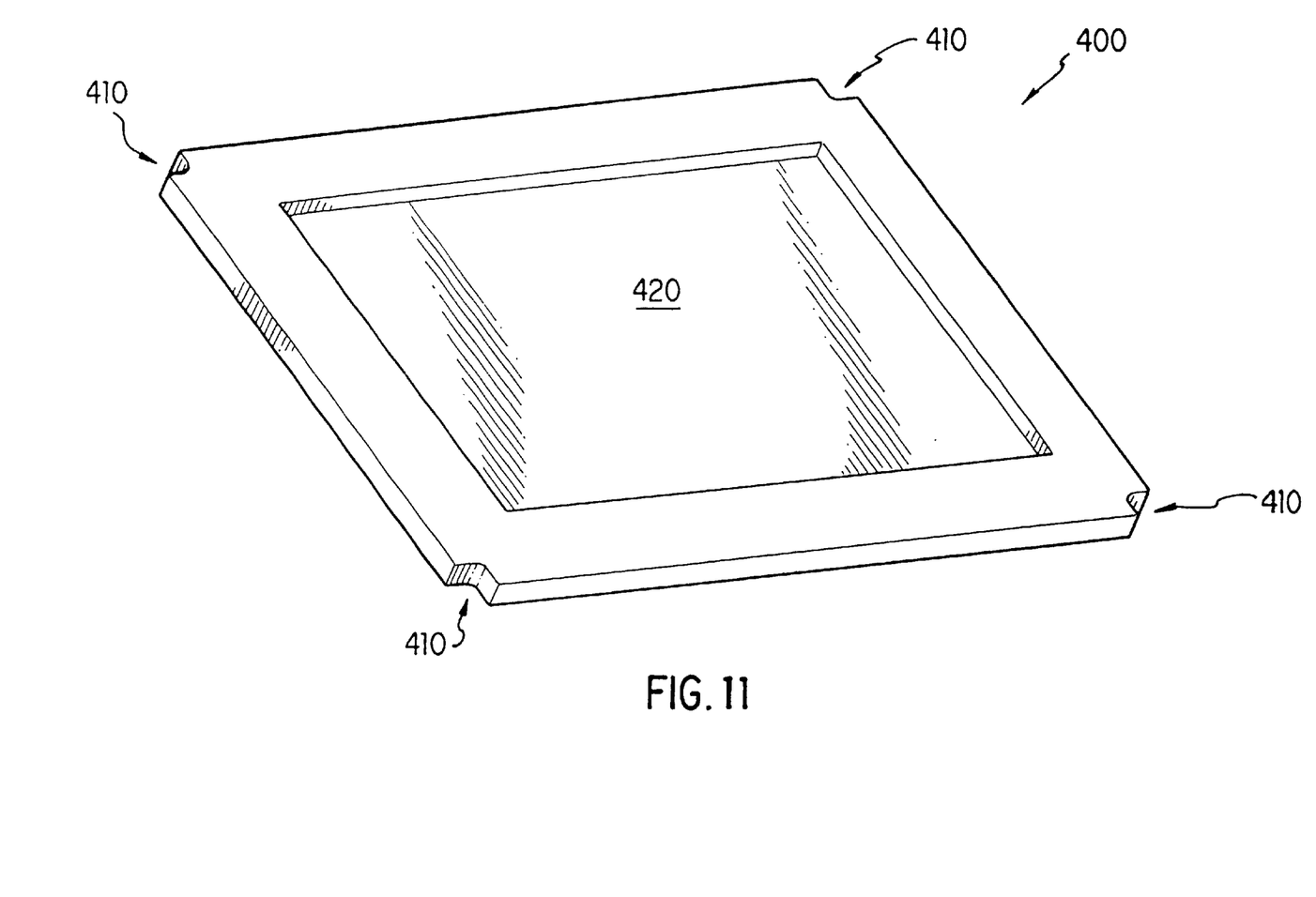
FIG. 11 is a top perspective view of a second embodiment for a tray cover in accordance with the present invention.
Figure 12:
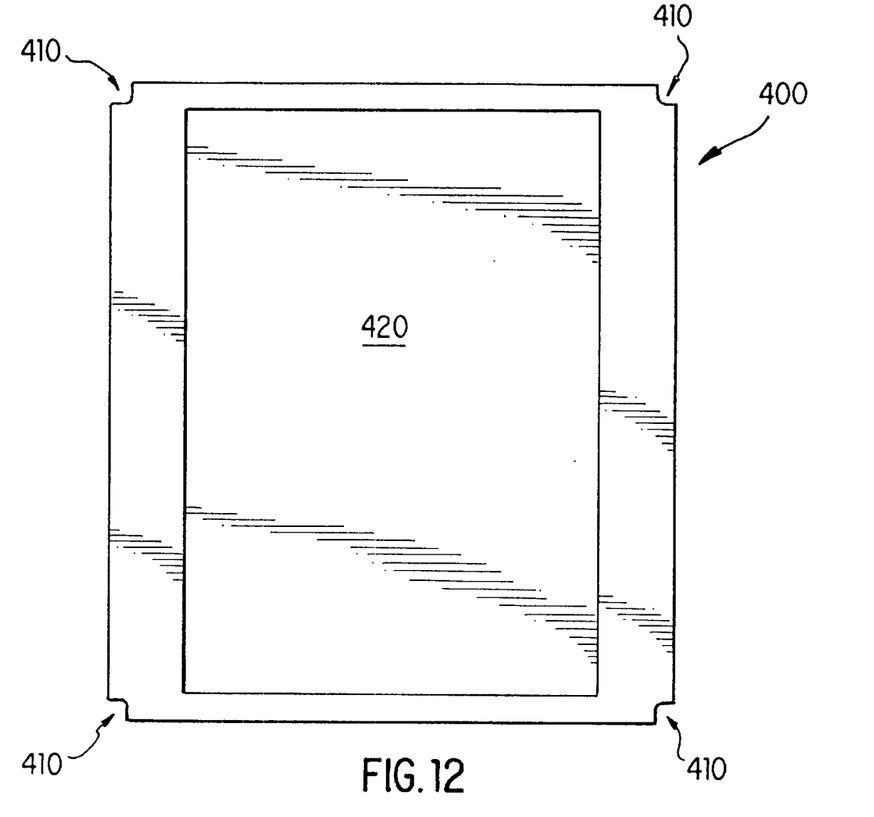
FIG. 12 is a top view of the tray cover of FIG. 11.
Figure 13:
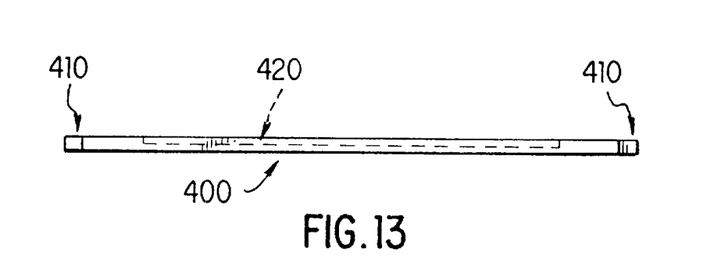
FIG. 13 is a side view of the tray cover of FIG. 11.

An alternative embodiment for a tray cover in accordance with the present invention is illustrated in FIGS. 11–13. In the embodiment of FIGS. 11–13, tray cover 400, similar to tray cover 300, is generally a thin, planar member that has dimensions which are similar to the outer dimensions for storage apparatus 10. As can be seen, tray cover 400 also defines a plurality of apertures which, when tray cover 400 is placed onto top side 100 of storage apparatus 10, receives within them the mounting pins that are disposed on first side 100 of storage apparatus 10. As such, tray cover 400 defines corner notches 410 that are included on each of the four corners of tray cover 400. Each corner notch 410 is formed by a right angle and mounting pins 180 are positioned within corner notches 410. Thus, as can be understood, when each of the mounting pins 180 are positioned within corner notches 410, tray cover 400 will not be able to rotate on top side 100 of storage apparatus 10 and thus will be maintained in position on storage apparatus 10.

Whereas tray cover 300 also defines a mounting aperture 320 which is generally located in the geometric center of tray cover 300 and into which is received mounting pin 190 that is included on top side 100 of storage apparatus 10, in the embodiment of FIGS. 11–13, tray cover 400 does not contain a center mounting aperture. Thus, storage apparatus 10, when used with tray cover 400, does not contain a center mounting pin.

Tray cover 400 defines a recess 420 within it. Recess 420 is generally rectangularly-shaped and has a depth of approximately 0.125 inches. As can be understood, when multiple storage apparatuses 10 are stacked upon each other, recess 420 provides space within the stacked apparatuses that can be used, for example, to store paper documentation related to a particular assembly within the tray that stores the assembly. The documentation can be placed within the recess of the tray cover and the storage apparatuses can still be stacked one upon another without interference from the stored documentation.

The disclosed embodiments are illustrative of the various ways in which the present invention may be practiced. Other embodiments can be implemented by those skilled in the art without departing from the spirit and scope of the present invention.

What is claimed is:

1. A fiber optic assembly storage apparatus comprising:
 a storage tray, said storage tray having a first side and a second side, said first side opposite said second side and said first side defining:
 an optical component storage channel;
 a plurality of optical component storage cells;
 an optical component fiber storage channel disposed at a first end of said optical component storage channel; and
 a coupling fiber storage channel, said coupling fiber storage channel interconnecting said optical component storage channel and said plurality of optical component storage cells;
 wherein each of said plurality of optical component storage cells includes a front wall structure and a rear wall structure and wherein the rear wall structure of a first optical component storage cell in said plurality of optical component storage cells is the front wall structure of a second optical component storage cell in said plurality of optical components storage cells.

2. The fiber optic assembly storage apparatus of claim 1 wherein each of said plurality of optical component storage cells are aligned on a common axis and are positioned in an adjacent relationship.

3. The fiber optic assembly storage apparatus of claim 1, wherein each of said front wall structures and said rear wall structures defines an aperture therein.

4. The fiber optic assembly storage apparatus of claim 1 wherein said optical component storage channel and each of said plurality of optical component storage cells has a first depth and a second depth.

5. The fiber optic assembly storage apparatus of claim 1 wherein said coupling fiber storage channel extends around an outer circumference of said first side of said storage tray.

6. The fiber optic assembly storage apparatus of claim 1 wherein first side of said storage tray further defines a circularly-shaped coupling fiber spool channel, said circularly-shaped coupling fiber spool channel intersecting said coupling fiber storage channel.

7. The fiber optic assembly storage apparatus of claim 1 wherein said second side of said storage tray defines a first access port and a second access port, said first and second access ports disposed on opposite sides of said second side of said storage tray and said first and second access ports having a rectangular configuration.

8. The fiber optic assembly storage apparatus of claim 1 further comprising a tray cover, said tray cover disposed on said first side of said storage tray.

9. The fiber optic assembly storage apparatus of claim 8 wherein said tray cover defines a rectangularly-shaped recess on a first side of said tray cover.

10. A fiber optic assembly storage apparatus comprising:
   a storage tray, said storage tray having a first side and a second side, said first side opposite said second side and said first side defining;
   an optical component storage channel;
   a plurality of optical component storage cells:
   an optical component fiber storage channel disposed at a first end of said optical component storage channel; and
   a coupling fiber storage channel, said coupling fiber storage channel interconnecting said optical component storage channel and said plurality of optical component storage cells, wherein said first side of said storage tray further defines a circularly-shaped optical component fiber spool channel, said optical component fiber spool channel integrally formed with said optical component fiber storage channel,
   wherein said first side of said storage tray further defines an optical component connector channel, said optical component connector channel integrally formed with said circularly-shaped optical component fiber spool channel and oriented on an axis perpendicular to said optical component fiber storage channel.

11. A fiber optic assembly storage apparatus comprising:
   a storage tray, said storage tray having a first side and a second side, said first side opposite said second side and said first side defining;
   an optical component storage channel;
   a plurality of optical component storage cells;
   an optical component fiber storage channel disposed at a first end of said optical component storage channel; and
   a coupling fiber storage channel, said coupling fiber storage channel interconnecting said optical component storage channel and said plurality of optical component storage cells; and
   a plurality of mounting pins, said mounting pins extending from said first side of said storage tray, wherein all but one of said plurality of mounting pins extend from one of a plurality of corners on said storage tray; and wherein one of said plurality of mounting pins extends from approximately a geometric center of said storage tray.

12. The fiber optic assembly storage apparatus of claim 11 further comprising a tray cover disposed on said first side of said storage tray, said tray cover defining a plurality of apertures, said tray cover plurality of apertures aligning with said plurality of mounting pins.

13. A method for storing a fiber optic assembly comprising the steps of:
   inserting a first fiber optic component into a fiber optic component storage channel defined by a storage tray;
   inserting a portion of an optical fiber into a coupling fiber storage channel defined by said storage tray, said optical fiber connected to said first fiber optic component at a first end and a second fiber optic component at a second end;
   inserting said second fiber optic component into one of a plurality of optical component storage cells that are aligned on a common axis and are positioned in an adjacent relationship and wherein said second fiber optic component is inserted within said one of said plurality of optical component storage cells based upon a length of said optical fiber that is not stored within said coupling fiber storage channel;
   positioning a tray cover on said storage tray and
   positioning a second storage tray on said storage tray, said tray cover disposes between said second storage tray and said storage tray.

14. The method of claim 13 further comprising the step of winding said optical fiber within a circularly-shaped spool channel defined by said storage tray, said spool channel disposed between said fiber optic component storage channel and said plurality of optical component storage cells.

15. The method of claim 13 wherein said step of positioning said tray cover on said storage tray comprises the step of aligning a plurality of mounting pins disposed on said storage tray with a plurality of apertures defined by said tray cover.

* * * * *